United States Patent
Draghetti et al.

[11] Patent Number: 6,094,893
[45] Date of Patent: Aug. 1, 2000

[54] METHOD AND A DEVICE FOR SECURING SELECTED PORTIONS OF HEAT-SEALABLE PRODUCT WRAPPINGS

[75] Inventors: Fiorenzo Draghetti, Medicina; Mario Turra, Casalecchio di Reno, both of Italy

[73] Assignee: G.D S.p.A., Bologna, Italy

[21] Appl. No.: 09/095,144

[22] Filed: Jun. 10, 1998

[30] Foreign Application Priority Data

Jun. 10, 1997 [IT] Italy .................... BO97A0354

[51] Int. Cl.[7] .................... B65B 51/10
[52] U.S. Cl. .................... 53/477; 53/373.7; 53/375.9
[58] Field of Search .................... 53/477, 479, 373.7, 53/375.9, DIG. 2; 219/243, 388, 528

[56] References Cited

U.S. PATENT DOCUMENTS

| | | | |
|---|---|---|---|
| 3,075,326 | 1/1963 | Waite | 53/477 |
| 3,101,898 | 8/1963 | Mader | 53/477 |
| 4,080,241 | 3/1978 | Grevich et al. | 53/479 |
| 4,216,638 | 8/1980 | Yoshida | 53/375.9 |
| 4,445,025 | 4/1984 | Netz | 53/375.9 |
| 4,981,006 | 1/1991 | Caenazzo et al. | 219/243 |
| 5,352,321 | 10/1994 | Held | 219/243 |

FOREIGN PATENT DOCUMENTS

| | | | |
|---|---|---|---|
| 0553635A1 | 8/1993 | European Pat. Off. | |
| 582461 | 2/1994 | European Pat. Off. | 53/373.7 |
| 2237877 | 5/1978 | Germany | 53/373.7 |
| 1032039 | 6/1966 | United Kingdom | |
| 1365986 | 9/1974 | United Kingdom | 53/477 |

*Primary Examiner*—Eugene Kim
*Attorney, Agent, or Firm*—Pillsbury Madison & Sutro LLP

[57] ABSTRACT

The end folds of cellophane wrappings applied to products advancing along a given feed direction are heat-sealed by a device appearing substantially as a feed channel. The channel coincides with the feed direction and is compassed at least on one side by a conveyor belt extending parallel with a fixed path followed by the products and equipped with a succession of heated pads positioned to enter into contact with selected portions of the end folds; during their passage along the path, only the pads occupying one or more limited sections of the feed channel will be heated, according to the amount of thermal energy that needs effectively to be transferred to the pads in order to seal the folds.

26 Claims, 2 Drawing Sheets

METHOD AND A DEVICE FOR SECURING SELECTED PORTIONS OF HEAT-SEALABLE PRODUCT WRAPPINGS

BACKGROUND OF THE INVENTION

The present invention relates to a method for securing selected portions of heat-sealable wrappings applied to products.

In particular, the present invention relates to a method of securing the end folds of overwrappings fashioned in transparent heat-sealable material around packets of cigarettes, to which reference is made explicitly in the following specification, albeit implying no limitation in the general scope of the disclosure.

Overwraps of the type in question are produced normally with a "cellophaner", a machine comprising a unit by which a sheet of the transparent material in question is folded around a packet to form a tubular wrapper of which the opposite ends project initially beyond the end faces of the packet; each projecting end is then folded inwards to form two partially overlapping flaps, which are flattened into contact with the relative end face and united by heat-sealing. It is the conventional practice to secure these overlapping flaps using a heat-seal device that comprises two identical belts looped around respective pulleys; such belts are generally metallic and heated electrically. The two belts are arranged with two respective rectilinear branches extending mutually parallel and advancing in the same direction, in such a way that a feed channel is created between them.

Given that each end face of the cigarette packet reacts to externally imposed mechanical stresses by inflecting, as if it were a plate restrained about the periphery, the operating surfaces of the two belts are furnished with respective pluralities of uniformly distributed projections or pads caused to advance synchronously along the feed channel. As the packets pass along the feed channel between the two belts, pressure is applied by the pads to the overlapping flaps and the end faces of the packets in the appropriate manner, with the result that the flaps are sealed together by the combined action of pressure and heat.

The pads are heated by conduction through contact with the metal conveyor belt, the belt in its turn being heated electrically.

In one particular heat-seal device of this type, the belt and the relative sets of pads are heated by electromagnetic induction. Current generated by an expander device linked to the belt is caused to circulate by way of electrical conductors extending along the full length of the belt and connecting the pads one with another in short circuit.

The electrical resistance of the pads is higher than that of the conductors embedded in the belt, so that with an induced current circulating through the conductors, the temperature of the pads is raised to a value higher than that of the belt by the resulting Joule effect.

The main drawback encountered with solutions of the type described above is attributable to the manner of heating the pads.

To heat the entire metallic conveyor belt so as to heat the pads, or to exploit the effect of mutual induction generated between the belt and the expander to circulate a current along the full length of the belt, it becomes necessary to heat a relatively large mass of material, which involves a waste of heat, and therefore of energy, but more especially brings about a situation typified by significantly high thermal inertias. As a result, the temperature of the pads cannot be regulated quickly to adapt to the instantaneous velocity of the machine. Given the proportions of the mass to be heated, moreover, one has a rise in temperature affecting the entire area around the conveyor belt, and consequently an undesirable transfer of heat to the packet as a whole during the operation by which the end folds are secured.

The object of the present invention is to provide a method whereby selected portions of heat-sealable product wrappings can be secured without any of the drawbacks mentioned above in connection with the prior art.

SUMMARY OF THE INVENTION

The stated object is duly realized in a method according to the invention for securing selected portions of heat-sealable product wrappings.

Such a method comprises the step of advancing the products toward a heat-seal device embodied as a feed channel extending along a predetermined path in a predetermined feed direction and compassed at least on one side by a first conveyor belt, looped around respective pulleys and advancing along the predetermined path, of which the face is equipped with a plurality of pads positioned to enter into contact along the feed channel with the selected portions of the product wrappings.

The essential feature of the method disclosed is that it comprises the further step of heating only the pads occupying at least one limited section of the feed channel.

Also disclosed is a device for securing selected portions of heat-sealable wrappings, embodied as a feed channel extending along a predetermined path and in a predetermined feed direction and compassed at least on one side by a first conveyor belt, looped around respective pulleys and advancing along the predetermined path, of which the face is equipped with a plurality of pads positioned to enter into contact along the selfsame path with the selected portions of the wrappings; such a device comprises heating means operating in conjunction with the pads, disposed and embodied in such a way as to heat only the pads occupying at least one limited section of the feed channel.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
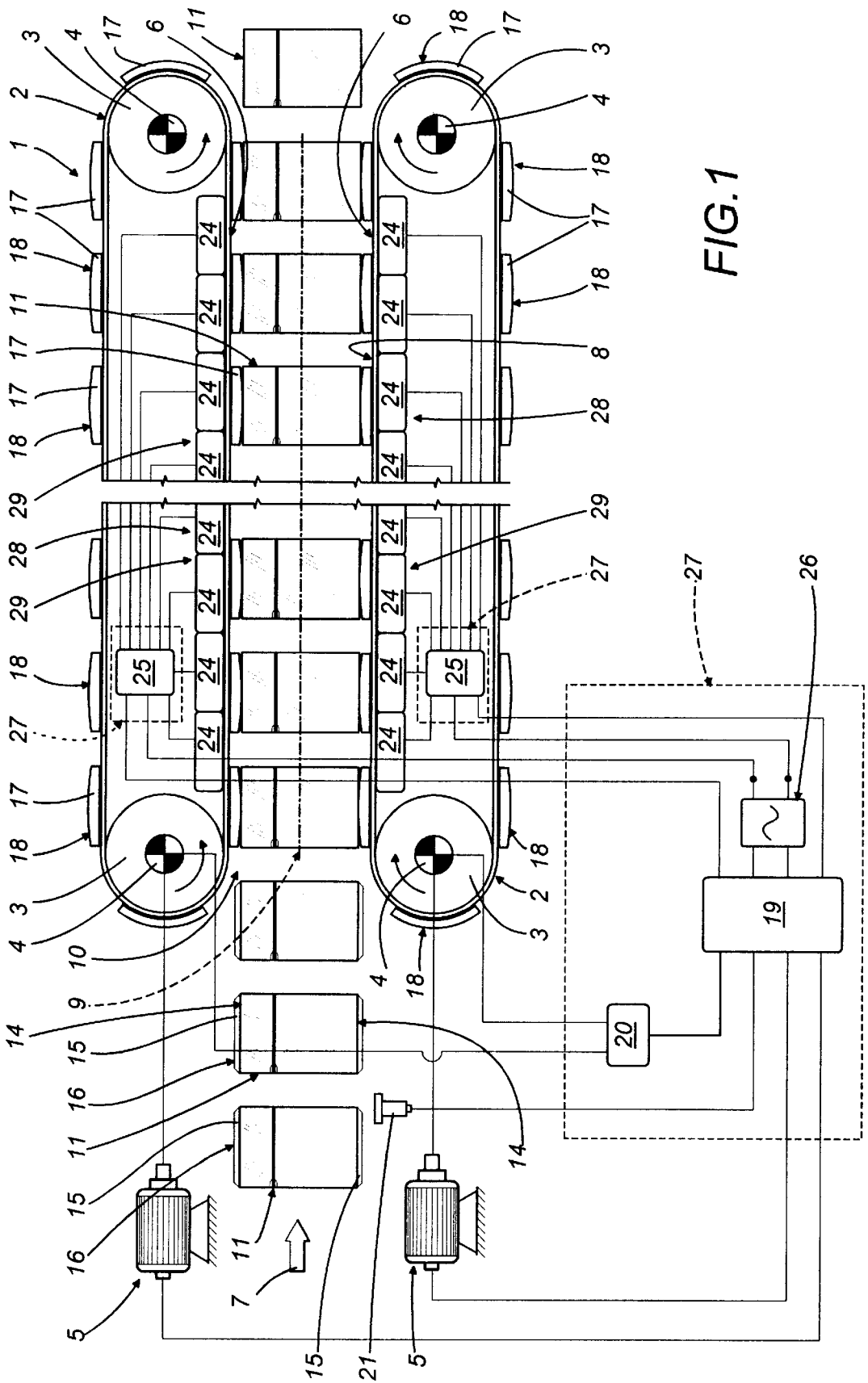
FIG. 1 illustrates a heat-seal device embodied in accordance with the invention, seen schematically in plan and in part as a block diagram.

Referring to FIG. 1 of the drawings, 1 denotes a heat-seal device, in its entirety, comprising two identical belt loops definable as a first conveyor belt 2 and second conveyor belt 2 respectively, each of which is tensioned around two pulleys 3 mounted to respective shafts 4 disposed mutually parallel and driven by respective motors 5.

The two belts 2 afford two respective rectilinear branches 6 disposed facing one another, mutually parallel and capable of movement in a predetermined direction denoted 7 in FIG. 1; the two branches 6 thus combine to create a feed channel 8, extending along a predetermined path 9, of which the entry point is denoted 10.

11 denotes one of a succession of products which in the present specification are shown, by way of example, as packets of cigarettes each enveloped by a relative wrapping 12 that consists in a sheet 13 of transparent heat-sealable material folded around the packet 11; in a conventional folding sequence, portions of the sheet 13 are left projecting beyond the two opposite end faces 14 of the packet 11, providing the material for two end flaps 15 that will be flattened ultimately against the relative end face 14, overlapping in part, to complete the formation of the transparent wrapping 12 around the relative packet 11. The central overlapping area of the two end flaps 15 is referred to in the present specification as a "selected portion", denoted 16, that will be heat-sealed by the device 1 to which the invention relates.

The packets 11, each enveloped in a relative wrapping 12, are advanced along the aforementioned predetermined direction 7 in conventional manner and at a given frequency toward the entry point 10 of the heat-seal device 1.

Each belt 2 is fashioned in a material possessing both thermal and electrical insulation properties, and carries a plurality of elastically deformable, flexible pads 17 distributed uniformly along its outer surface. The dimensions of the single pad 17 are substantially identical to the dimensions of the end face 14 presented by the single packet 11, whilst the outwardly directed surface 18 of the pad is convex and disposed in such a manner that when advancing along the channel 8, the surface 18 of a given pad 17 will be separated from the surface 18 of a corresponding pad 17 on the belt 2 opposite by a distance no greater than the length of a single packet 11.

Of the two motors 5, one operates as master and is connected to the other motor, or slave, by way of a monitoring and piloting device 19 connected on the input side to a sensing device 20 such as will detect the angular velocity of the pulleys 3. The operation of the motors 5 is interlocked to the monitoring and piloting device 19, which functions as a synchronizing mechanism responding to signals received from the sensing device 20 in such a way as to ensure that the advancing belts stay timed with one another and that each pad 17 remains thus in exact alignment with a corresponding pad of the belt 2 opposite during its progress along the feed channel 8.

Also connected to the input side of the selfsame monitoring and piloting device 19 is a sensor 21 that serves to verify the passage of the packets 11 advancing along the predetermined direction 7 and approaching the entry point 10 of the channel 8.

Figure 2:
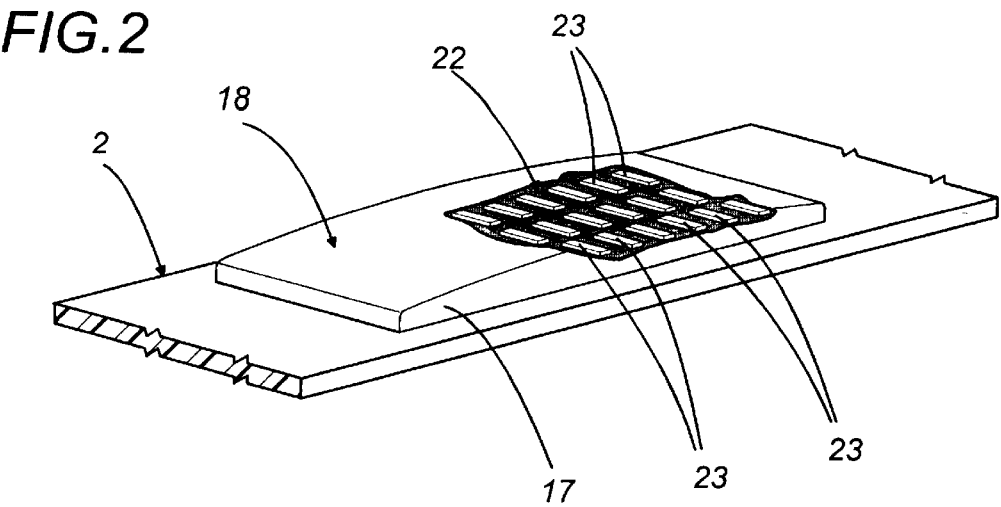
FIG. 2 shows an enlarged detail of FIG. 1, viewed schematically in perspective with certain parts cut away and others in section.

In addition to being fashioned from elastically deformable material and flexible, the pads 17 are thermally conductive thanks to the inclusion of a special ferromagnetic material. More exactly, and referring to FIG. 2, each pad 17 comprises a body of silicone plastics material 22 and, embedded and distributed within the plastic matrix, powders or plates 23 of ferromagnetic material such as will allow the aforementioned conduction of heat. Each individual pad 17 is thermally and electrically insulated from the adjacent pads 17 on either side.

Observing FIG. 1, it will be seen that each belt 2 of the device 1 is associated with a respective battery of inductors 24 operating independently of one another and arranged in succession along the feed channel 8. The inductors 24 are breasted substantially in contact with the inside face of the respective rectilinear branch 6, i.e. the face opposite to that carrying the pads 17.

Each inductor 24 can be coupled electrically via a relative selector device 25 to a generator 26, to which indeed all the inductors 24 are connected. The operation of both the selector devices 25 and the generator 26 is interlocked to the monitoring and piloting device 19, which will supply power as appropriate to activate at least a proportion of the inductors 24 installed.

The position occupied by the inductors 24 in relation to the pads 17 advancing along the feed channel 8 is such that the magnetic flux generated by the battery can be linked entirely or in part to the pads, so that the plates 23 are brought within the magnetic field and invested with electromotive force (emf); this results in the circulation of a current proportional to the magnetic field, by which the plates 23 are heated. The heating current is characterized by transients of particularly short duration, given that the plates 23 are of a ferromagnetic material, thus allowing the pads 17 to be both heated and cooled in a short time. Being fashioned from an insulating material, for example a dielectric, the belt 2 remains unaffected by the mutual induction occurring between the inductors 24 and the pads 17, and accordingly the heating action is concentrated entirely on the pads 17.

Depending on the amount of heat it is wished to transfer to each pad 17 during its movement along the feed channel 8, the monitoring and piloting device 19 activates the selector device 25, which in turn will connect the generator 26 to one or all of the inductors 24 according to the type of signal received.

It will be clear that the number of inductors 24 energized is a function of the rate at which the pads 17 advance, hence of their linear velocity of the feed channel 8, and of the type of material 13 utilized in fashioning the wrappings 12 around the packets 11. In effect, the faster the rate at which the pads 17 advance, the shorter will be the time that any one pad 17 remains in a position allowing linkage to an energized inductor 24.

For example, if at a certain linear velocity V of the belts 2 (derived from the angular velocity of the pulleys by the sensing device 20), hence also of the pads 17 moving along the feed channel 8, the heat required by the pads 17 in order to effect a successful heat-seal of the selected portions 16 of the sheet 13 can be transferred within a section of the channel 8 equivalent to two inductors 24 only, the monitoring and piloting device 19 will activate the selector devices 25 in such a way that only the first two inductors 24 of the battery are coupled to the electrical generator 26. In the event that the linear velocity of the belts is V1>V, then obviously the monitoring and piloting device 19 will activate the selector devices 25 in such a way that more of the inductors 24 are coupled to the electrical generator 26, thus increasing the length of the feed channel 8 along which the pads 17 are linked mutually with the energized inductors 24.

The monitoring and piloting device 19, sensing device 20, selector devices 25 and generator 26 combine to create monitoring and piloting means 27, whereas the battery of inductors 24 constitutes heating means 28 and, similarly, inductor means 29.

Figure 3:
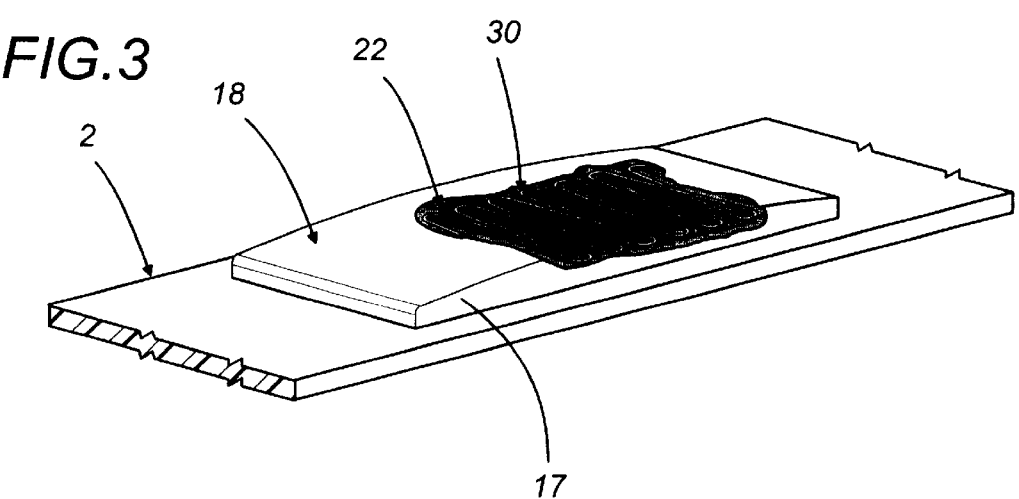
FIG. 3 shows the enlarged detail of FIG. 2 in an alternative embodiment, viewed schematically and in perspective with certain parts cut away and others in section.
Figure 4:
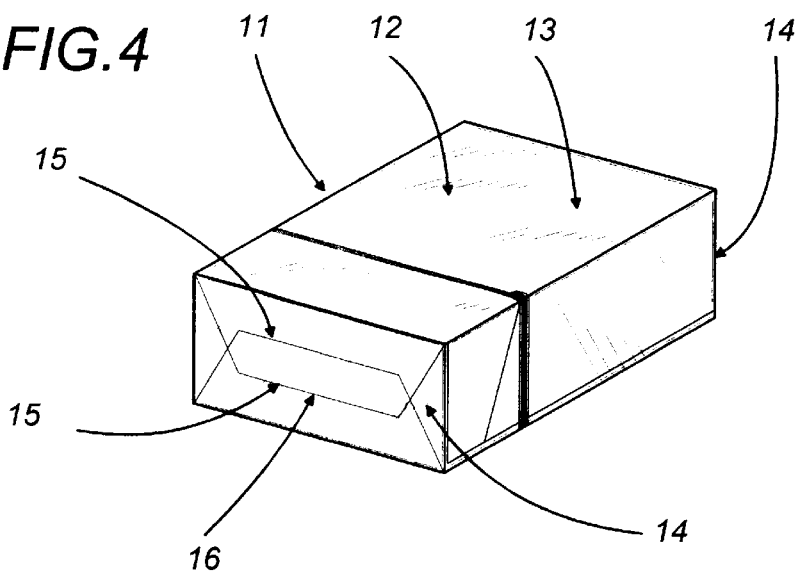
FIG. 4 is the perspective view of a packet of cigarettes overwrapped in heat-sealable material.

To exploit the effects of mutual induction to the full and thus maximize the heating potential of the pads 17 when linked to the inductors 24, the pad 17 could comprise a ferromagnetic coil 30 embedded in the same silicone plastics matrix 22, as indicated in FIG. 3.

In a preferred version of the device, the pads 17 would be embodied integrally with the respective conveyor belts 2.

It will be appreciated from the foregoing that the heat-seal device 1 described and illustrated can be adapted swiftly to any operating requirement of the machine with which it is associated, thanks to the facility of heating only a given number of pads 17 occupying a suitably proportioned length of the feed channel 8, as dictated by the prevailing conditions; moreover, the device 1 is extremely simple and will bring considerable energy savings.

What is claimed:

1. A method for securing selected portions of heat-sealable wrappings of products, comprising the steps of:

advancing the products toward a heat-seal device including a feed channel extending along a predetermined path in a predetermined feed direction and formed at least on one side by a first conveyor belt looped around respective pulleys and advancing along the predetermined path, one of two faces of the conveyor belt being equipped with a plurality of pads positioned to enter into contact along the feed channel with the selected portions of the product wrappings;

heating the pads only, and only the pads occupying at least one limited section of the feed channel;

wherein the step of heating the pads includes varying a number of limited sections of the feed channel along which the pads are heated, according to an amount of heat that needs to be transferred to each pad in order to heat-seal the selected portions of the product wrappings during their passage along the channel.

2. A method as in claim 1, wherein the amount of heat to be transferred to each pad is dependent on a rate at which the products advance along the feed channel and on a type of material utilized as the product wrappings.

3. A method as in claim 1, wherein the pads are heated by a heater adapted to heat only the pads.

4. A method as in claim 1, wherein the pads are heated by electro-magnetic induction produced by an inductive heater mutually linkable with the pads only.

5. A method as in claim 4, wherein the inductive heater includes a plurality of mutually independent inductors associated with the feed channel, distributed along the predetermined path and connected to respective monitoring and piloting means adapted to selectively energize and de-energize the independent inductors, thereby varying the number of limited sections of the channel along which, during the advance of the first conveyor belt, mutual induction occurs between an energized inductor and the relative pad linked with the inductor so that only the pad is heated.

6. A method as in claim 1, wherein the first conveyor belt is constructed from a material with electrical and thermal insulating properties.

7. A method as in claim 1, wherein the pads are constructed of a flexible and heat conductive material and have magnetic properties such as will allow them to link mutually with the inductors.

8. A method as in claim 7, wherein the pads have low thermal inertia.

9. A method as in claim 8, wherein at least one of the pads is constructed of a silicone material containing at least one of powders and plates of ferromagnetic material.

10. A method as in claim 8, wherein at least one of the pads is constructed of a silicone material in which a coil of ferromagnetic material is embedded.

11. A method as in claim 1, wherein the products are packets of cigarettes overwrapped with the heat-sealable wrapping material and present respective end faces each covered by partially overlapping flaps of the wrapping comprising the selected portions to be heat-sealed, and wherein the feed channel is formed on either side by mutually opposed and parallel rectilinear branches respectively of the first belt and a second belt looped around respective pulleys and carrying respective pluralities of uniformly distributed pads adapted to advance synchronously along the channel, the pads of the respective belts including convex surfaces disposed facing and separated one from another by a distance no greater than a distance between the end faces of a single packet of cigarettes.

12. A method as in claim 1, wherein each pad is thermally and electrically insulated from the pads adjacent on either side.

13. A device for securing selected portions of heat-sealable wrappings of products, comprising:

a heat-seal device including a feed channel extending along a predetermined path and in a predetermined feed direction and formed at least on one side by a first conveyor belt looped around respective pulleys and advancing along the predetermined path, one of two faces of the conveyor belt being equipped with a plurality of pads positioned to enter into contact along the feed channel with the selected portions of the product wrappings, and heating means operating in conjunction with the pads, the heating means being disposed and adapted so as to heat the pads only and only the pads occupying at least one limited section of the feed channel;

wherein the heating means is adapted to vary the number of limited sections of the feed channel along which the pads are heated according to an amount of heat that needs to be transferred to each of the pads in order to heat-seal the selected portions of the wrappings during the passage of the products along the feed channel.

14. A device as in claim 13, wherein the amount of heat transferred by the heating means to each of the pads is dependent on a rate of advance along the feed channel and on a type of material utilized as the wrappings.

15. A device as in claim 13, wherein the heating means comprises inductor means mutually linkable with the pads only, and adapted to generate a mutual electromagnetic induction with the pads.

16. A device as in claim 15, wherein the heating means comprises a plurality of mutually independent inductors associated with the feed channel, distributed along the predetermined path substantially in contact with an inside face of the first belt opposite the face carrying the pads, and connected to monitoring and piloting means adapted to selectively energize and de-energize the independent inductors, thereby varying the number of limited sections of the feed channel along which, during the advance of the first belt, mutual induction occurs between an energized inductor and the respective pad linked with the inductor in such a way that only the pad is heated.

17. A device as in claim 16, wherein the monitoring and piloting means comprises a monitoring and piloting device connected on an input side to a sensor device adapted to detect an angular velocity of one of the pulleys about which each belt is looped, and to a sensor verifying the passage of the products, and on an output side, to an electrical generator supplying power to the inductors, and to a respective selector device through which the generator can be coupled electrically to and thus adapted to energize the pads according to an amount of heat to be transferred to each pad and consequently to vary the number of limited sections of the channel along which the pads are heated.

18. A device as in claim 13, wherein the first conveyor belt is constructed from a material with electrical and thermal insulating properties.

19. A device as in claim 13, wherein the pads are constructed of a flexible, elastically deformable and thermally conductive material and have magnetic properties such as will allow them to link mutually with the inductors.

20. A device as in claim 19, wherein the pads have low thermal inertia.

21. A device as in claim 20, wherein at least one of the pads is constructed of a silicone material containing at least one of powders and plates of ferromagnetic material.

22. A device as in claim 19, wherein at least one of the pads is constructed of a silicone material in which a coil of ferromagnetic material is embedded.

23. A device as in claim 13, wherein the products are packets of cigarettes overwrapped with the heat-sealable wrapping material and present respective end faces each covered by partially overlapping flaps of the wrapping comprising the selected portions to be heat-sealed, and wherein the feed channel is formed on either side by mutually opposed and parallel rectilinear branches respectively of the first belt and a second belt looped around respective pulleys and carrying respective pluralities of uniformly distributed pads adapted to advance synchronously along the path, the pads of the respective belts including convex surfaces disposed facing and separated one from another by a distance no greater than a distance between the end faces of a single packet of cigarettes.

24. A device as in claim 17, wherein the monitoring and piloting device is connected on the output side to a master motor and a slave motor by which the pulleys are driven in such a way that the first and second belts will advance synchronously one with another.

25. A device as in claim 13, wherein each pad is thermally and electrically insulated from the pads adjacent on either side.

26. A device as in claim 13, wherein each pad is incorporated directly into the respective belt.

* * * * *